United States Patent
Wan et al.

(10) Patent No.: US 9,096,028 B2
(45) Date of Patent: Aug. 4, 2015

(54) ARTICLE OF FOOTWEAR FORMED FROM TWO PREFORMS AND METHOD AND MOLD FOR MANUFACTURING SAME

(75) Inventors: Tee L. Wan, Beaverton, OR (US); Thienchai Chaisumrej, Bangkok (TH); Chia-Yi Wu, Long An Province (VN); Gjermund Haugbro, Hochiminh (VN)

(73) Assignee: NIKE, Inc., Beaverton, OR (US)

( * ) Notice: Subject to any disclaimer, the term of this patent is extended or adjusted under 35 U.S.C. 154(b) by 824 days.

(21) Appl. No.: 13/206,899

(22) Filed: Aug. 10, 2011

(65) Prior Publication Data
US 2013/0036627 A1 Feb. 14, 2013

(51) Int. Cl.
*B29D 35/14* (2010.01)
*B29C 33/00* (2006.01)
*B29D 35/12* (2010.01)
*B29C 44/12* (2006.01)
*A43B 13/12* (2006.01)
*A44B 13/00* (2006.01)

(52) U.S. Cl.
CPC ............ *B29D 35/142* (2013.01); *A43B 13/127* (2013.01); *B29C 33/0055* (2013.01); *B29C 44/1204* (2013.01); *B29D 35/122* (2013.01); *B29D 35/148* (2013.01)

(58) Field of Classification Search
USPC ........... 264/46.4, 244, 247, 248; 156/83, 228, 156/267, 299; 425/129.2; 12/146 B
See application file for complete search history.

(56) References Cited

U.S. PATENT DOCUMENTS

| | | | | |
|---|---|---|---|---|
| 5,147,589 A | * | 9/1992 | Chang et al. | 264/45.1 |
| 5,433,022 A | * | 7/1995 | Lo et al. | 36/30 R |
| 7,700,021 B2 | * | 4/2010 | Cox et al. | 264/132 |
| 7,767,127 B2 | * | 8/2010 | Bramani | 264/244 |
| 2005/0276954 A1 | * | 12/2005 | Bramani | 428/195.1 |
| 2008/0073806 A1 | * | 3/2008 | Wang | 264/45.1 |
| 2010/0032865 A1 | | 2/2010 | Tsai | |
| 2010/0098797 A1 | * | 4/2010 | Davis et al. | 425/129.2 |
| 2012/0304501 A1 | * | 12/2012 | Song | 36/25 R |
| 2013/0199059 A1 | * | 8/2013 | Wan et al. | 36/25 R |

FOREIGN PATENT DOCUMENTS

EP 1604795 A2 12/2005
EP 2520422 A1 11/2012
(Continued)

OTHER PUBLICATIONS

International Search Report and Written Opinion issued in corresponding International Application No. PCT/US2010/030284, mailed Jul. 25, 2014.

(Continued)

*Primary Examiner* — Atul P. Khare
(74) *Attorney, Agent, or Firm* — Banner & Witcoff, Ltd.

(57) ABSTRACT

A method of manufacturing a midsole includes placing first and second preforms into a midsole recess of a mold, with first and second portions of the mold defining a first overflow chamber connected to the first recess; closing the mold by positioning the first and second portions in contact with one another; heating the mold for a predetermined period of time at a predetermined temperature such that the first and second preforms melt and bond together to form a midsole, with a portion of each of the first and second preforms flowing into the first overflow chamber to form a first overflow portion; removing the midsole from the mold; allowing the midsole to expand; and cutting away the first overflow portion.

14 Claims, 5 Drawing Sheets

(56) References Cited

FOREIGN PATENT DOCUMENTS

| FR | 2633810 | A1 | 1/1990 |
| GB | 2277706 | A | 11/1994 |
| WO | 2008019980 | A2 | 2/2008 |
| WO | 2010/045144 | A2 | 4/2010 |
| WO | 2013/023135 | A1 | 2/2013 |

OTHER PUBLICATIONS

International Search Report and Written Opinion, mailing date of Nov. 27, 2012, issued in counterpart International Application No. PCT/US2012/050309.

* cited by examiner

ARTICLE OF FOOTWEAR FORMED FROM TWO PREFORMS AND METHOD AND MOLD FOR MANUFACTURING SAME

FIELD

Aspects of this invention relate generally to a midsole for an article of footwear, and, in particular, to midsole formed from two preforms and a method and mold for manufacturing such a midsole.

BACKGROUND

Conventional articles of athletic footwear generally include two primary elements, an upper and a sole structure. The upper is secured to the sole structure and forms a void on the interior of the footwear for comfortably and securely receiving a foot. The sole structure is secured to a lower portion of the upper and is positioned between the foot and the ground. The sole structure generally incorporates multiple layers that are conventionally referred to as an insole, a midsole, and an outsole. The insole, or sockliner, is a thin, compressible member located within the void and proximate a lower surface of the foot to enhance footwear comfort. The midsole, which is conventionally secured to the upper along the length of the upper, forms a middle layer of the sole structure and is primarily responsible for attenuating ground (or other contact surface) reaction forces to lessen stresses upon the foot and leg. The outsole forms a ground-engaging portion (or other contact surface-engaging portion) of the sole structure, and is formed from a durable and wear-resistant material that includes texturing to improve traction.

The conventional midsole is primarily formed from a resilient, polymer foam material that extends throughout the length of the footwear, often by way of a molding process. The properties of the polymer foam material in the midsole are primarily dependent upon factors that include the dimensional configuration of the midsole and the specific characteristics of the material selected for the polymer foam, including the hardness or density of the polymer foam material. By varying these factors throughout the midsole, the relative stiffness and degree of ground reaction force attenuation may be altered to meet the specific demands of the activity for which the footwear is intended to be used. In addition to polymer foam materials, conventional midsoles may include, for example, one or more fluid-filled bladders and moderators.

In many articles of footwear, the midsoles are formed of two or more materials of different colors. In the molding of such midsoles, the two different materials may bleed together during the manufacturing process, which reduces the aesthetic appeal of the footwear.

It would be desirable to provide a midsole formed from two preforms and a method and mold for manufacturing such a midsole that reduces or overcomes some or all of the difficulties inherent in prior known devices. Particular advantages will be apparent to those skilled in the art, that is, those who are knowledgeable or experienced in this field of technology, in view of the following disclosure of the invention and detailed description of certain embodiments.

SUMMARY

The principles of the invention may be used to provide a midsole formed from two preforms and a method and mold for manufacturing such a midsole. In accordance with a first aspect, a method of manufacturing a support assembly for an article of footwear includes the steps of placing first and second preforms into a first recess in a first portion of a mold, with a second portion of the mold having a second recess that cooperates with the first recess to define a midsole recess, the first portion and the second portion cooperating to define a first overflow chamber connected to the midsole recess. The mold is closed by positioning the first and second portions in contact with one another. The mold is heated for a predetermined period of time at a predetermined temperature such that the first and second preforms melt and bond together to form a midsole within the first recess, with a portion of each of the first and second preforms flowing into the first overflow chamber to form a first overflow portion. The midsole is removed from the mold and allowed to expand. The first overflow portion of the midsole is then cut away.

In accordance with another aspect, a mold for forming a midsole includes a first portion having a first recess, a first lower chamber, and a first lower overflow recess, with the first lower chamber connecting the first lower overflow recess to the first recess. A second portion has a second recess, a first upper chamber, and a first upper overflow recess, with the first upper chamber connecting the second recess to the first upper overflow recess. The first recess and second recess cooperate to define a midsole recess, the first lower overflow recess and the first upper overflow recess combine to define a first overflow chamber, and the first lower chamber and the first upper chamber combine to define a first chamber that connects the first overflow chamber to the midsole recess, when the first portion and second portion are positioned in contact with one another such that the mold is in a closed condition.

In accordance with a further aspect, an article of footwear is formed by the steps of placing first and second preforms into a first recess in a first portion of a mold, with a second portion of the mold having a second recess that cooperates with the first recess to define a midsole recess, the first portion and the second portion cooperating to define a first overflow chamber and a first channel connecting the first overflow chamber to the midsole recess. The mold is closed by positioning the first and second portions in contact with one another. The mold is heated for a predetermined period of time at a predetermined temperature such that the first and second preforms melt and bond together to form a midsole within the first recess, with a portion of each of the first and second preforms flowing through the first channel into the first overflow chamber to form a first overflow portion. The midsole is removed from the mold and allowed to expand. The first overflow portion of the midsole is then cut away.

By providing a midsole formed from two preforms and a method and mold for manufacturing such a midsole, footwear with improved aesthetic appeal can be produced. These and additional features and advantages disclosed here will be further understood from the following detailed disclosure of certain embodiments.

Figure 1:
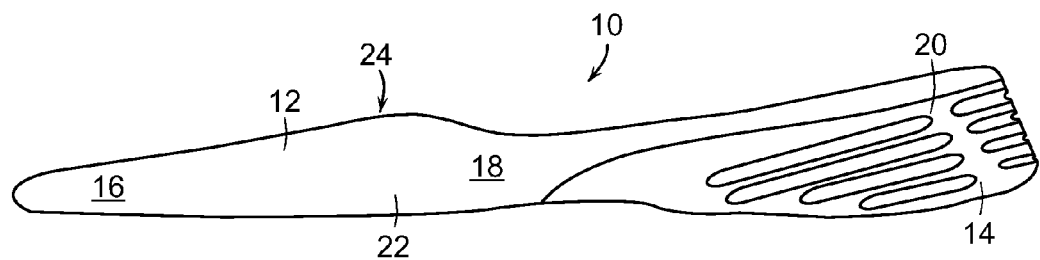
FIG. 1 is an elevation view of a midsole of an article of footwear formed from two different preforms.
Figure 2:
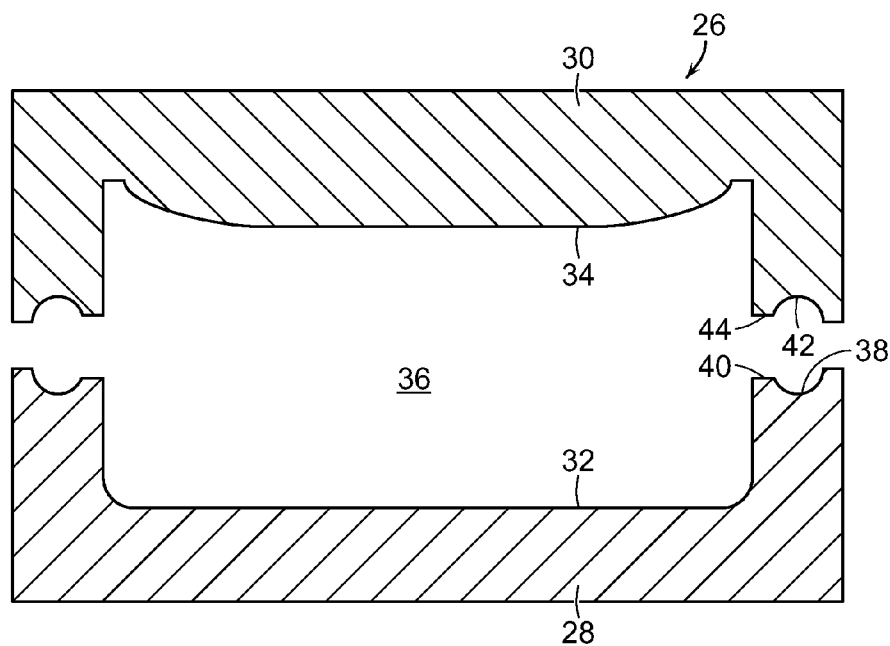
FIG. 2 is a section view of first and second portions of a mold used to make the midsole of FIG. 1, shown in an open condition.

The figures referred to above are not drawn necessarily to scale, should be understood to provide a representation of particular embodiments of the invention, and are merely conceptual in nature and illustrative of the principles involved. Some features of the mold used to form a midsole formed of different preforms and related methods of manufacture depicted in the drawings have been enlarged or distorted relative to others to facilitate explanation and understanding. The same reference numbers are used in the drawings for similar or identical components and features shown in various alternative embodiments. Molds used for forming midsoles as disclosed herein would have configurations and components determined, in part, by the intended application and environment in which they are used.

DETAILED DESCRIPTION OF CERTAIN PREFERRED EMBODIMENTS

A midsole 10 for an article of footwear is depicted in FIG. 1 as including a first portion 12 formed of a first material, and a second portion 14 formed of a second material. Midsole 10 serves to provide shock-attenuation and energy-absorption for an article of footwear. Midsole 10 can be used for any of various articles of casual footwear having configurations suitable, for example, for walking or lounging. Midsole 10 may also be included as part of a wide range of athletic footwear styles, including shoes that are suitable for soccer, running, basketball, baseball, cross-training, football, rugby, tennis, and volleyball, for example. An individual skilled in the relevant art will appreciate, therefore, that the concepts disclosed herein with regard to midsole 10 may be applied to a wide variety of footwear styles, in addition to the specific styles discussed herein and depicted in the accompanying figures.

For purposes of reference in the following description, midsole 10 may be divided into three general regions: a forefoot region 16, a midfoot region 18, and a heel region 20. Regions 16-20 are not intended to demarcate precise areas of midsole 10. Rather, regions 16-20 are intended to represent general areas of midsole 10 that provide a frame of reference during the following discussion. Although regions 16-20 apply generally to midsole 10, references to regions 16-20 also may apply specifically to first portion 12, second portion 14, or individual components or portions of midsole 10.

For purposes of reference, midsole 10 includes a medial side 22 and an opposite lateral side 24. Lateral side 24 is positioned to extend along a lateral side of the foot (i.e., the outside) and generally passes through each of regions 16-20. Similarly, medial side 22 is positioned to extend along an opposite medial side of the foot (i.e., the inside) and generally passes through each of regions 16-20.

The materials used to form first portion 12 and second portion 14 of midsole 10 may include any of the conventional polymer foams that are utilized in footwear midsoles, including ethylvinylacetate ("EVA") and polyurethane ("PU") foam. Other suitable materials for first portion 12 and second portion 14 will become readily apparent to those skilled in the art, given the benefit of this disclosure.

In certain embodiments, first portion 12 is formed of a material having a first color, while second portion 14 is formed of a material formed of a second color that is different than the first color. First and second portions 12, 14 may also have different physical properties.

In the illustrated embodiment, second portion 14 is positioned beneath first portion 12 and extends from the rear edge of heel region 20 to midfoot region 18 along medial side 22 of midsole 10, and to forefoot region 16 along lateral side 24. It is to be appreciated that second portion 14 can be positioned at any desired location along midsole 10.

A mold assembly 26 used to form midsole 10 is seen in FIGS. 2-5, and includes a first portion 28 and a second portion 30. In the illustrated embodiment, first portion 28, which is positioned beneath second portion 30, forms a bottom surface and a portion of the medial and lateral sides of midsole 10, while second portion 30 forms a top surface and a complimentary portion of the medial and lateral sides of midsole 10. It is to be appreciated that in other embodiments, first and second portions 28, 30 can have a different positional relationship with respect to one another.

First portion 28 includes a substantially foot-shaped first recess 32 formed therein, and second portion 30 includes a substantially foot-shaped second recess 34 formed therein. First recess 32 and second recess 34 combine to form a midsole recess 36 when mold assembly 26 is closed, as seen in FIG. 5.

First portion 28 includes a first lower overflow recess 38 and a first lower channel 40 connecting the first lower overflow recess 38 to the first recess 32. Second portion 30 includes a first upper overflow recess 42 and a first upper channel 44 connecting first upper overflow recess 42 to second recess 34.

Figure 5:
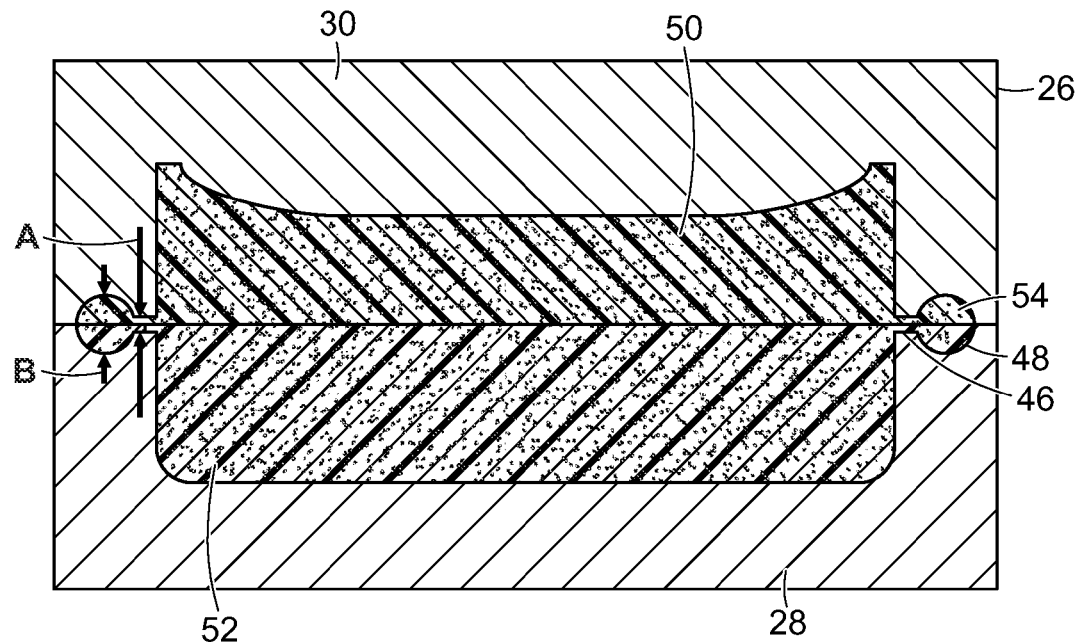
FIG. 5 is a section view of the mold of FIG. 2 shown in a closed condition with the midsole formed from the preforms after the heating step.

When mold assembly 26 is closed, as seen in FIG. 5, the first lower and upper channels 40, 44 combine to define a first channel 46. First lower overflow recess 38 and first upper overflow recess 42 combine to define a first overflow chamber 48, with first channel 46 connecting first overflow chamber 48 to midsole recess 36.

Figure 3:
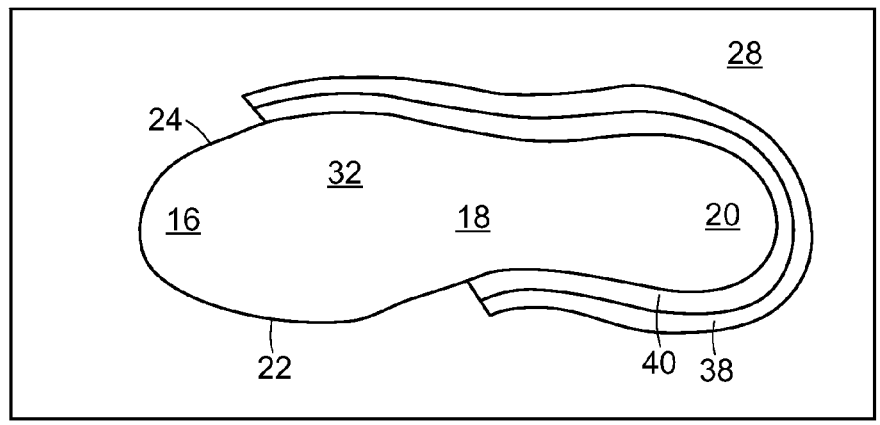
FIG. 3 is a plan view of the first portion of the mold of FIG. 2.
Figure 4:
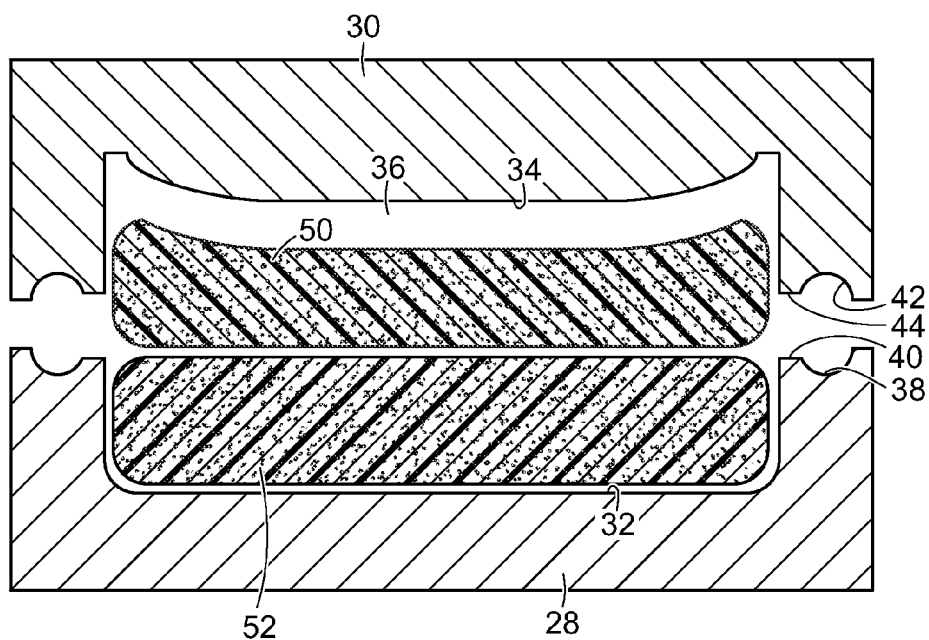
FIG. 4 is a section view of the first and second portions of the mold of FIG. 2, shown with a first preform and a second preform positioned in the mold prior to the mold being closed.

In the illustrated embodiment of FIGS. 3-5, first channel 46 and first overflow chamber 48 extend around heel region 20 of first recess 32, along medial side 22 to midfoot region 18, and along lateral side 24 to forefoot region 16. This can be best seen in FIG. 3, which shows first lower channel 40, which forms part of first channel 46, and first lower overflow recess 38, which forms part of first overflow chamber 48. It is to be appreciated that first channel 46 could extend only around heel region 20, or extend to any desired point along first recess 32.

As seen in FIG. 5, first channel 46 has a height A that is less than a height B of first overflow chamber 48. In a preferred embodiment, height A of first channel 46 is approximately 1 mm. In a preferred embodiment, height B of first overflow chamber 48 is approximately 5 mm. Additionally, in certain preferred embodiments, first channel 46 and first overflow chamber extend outwardly from first recess 32 approximately 5 mm.

As seen in the embodiment illustrated in FIG. 5, the cross-section of first channel 46 is substantially rectangular, while the cross-section of first overflow chamber 48 is substantially circular. It is to be appreciated that both first channel 46 and first overflow chamber 48 can have any desired shape, and that first overflow chamber 48 need not necessarily be larger than first channel 46. In other embodiments, first overflow chamber 48 could be connected directly to first recess 32 without a need for first channel 46 to connect first overflow chamber 48 to first recess 32.

To form midsole 10 in mold assembly 26, a first preform 50 and a second preform 52 are seated or placed in first recess 32 of first portion 28. In certain embodiments, first and second preforms 50, 52 are formed of EVA. In the illustrated embodiment, second preform 52 is seated beneath first preform 50. Second preform extends from a rear edge of heel portion 20 to midfoot region 18 on medial side 22 and to forefoot region 16 on lateral side 24.

A release agent may be applied to the exposed surface of first and second preforms 50, 52 and/or the surfaces of first recess 32 and second recess 34 in order to facilitate the separation of midsole 10 from mold assembly 26 after its formation. The release agent may be a spray release agent or any other suitable release agent. Suitable materials for the release agent include, for example, siloxane and water. Other suitable release agents will become readily apparent to those skilled in the art, given the benefit of this disclosure.

Mold assembly 26 is then closed, as seen in FIG. 5, so that first portion 28 of mold assembly 26 is in contact with second portion 30 of mold assembly 26, with first and second preforms 50, 52 seated within midsole recess 36. First portion 28 and second portion 30 may be hinged together, or they may be separate elements that are suitably aligned and placed in contact with one another.

Mold assembly 26 with first preform 50 and second preform 52 contained therein is then heated to a predetermined temperature for a predetermined period of time. In certain embodiments, mold assembly 26 at this point is heated to a temperature of between about 125° C. and about 135° C. In more preferred embodiments, mold assembly 26 is heated to a temperature of about 130° C.

In certain embodiments, mold assembly is heated for between about 5 and about 8 minutes, thereby causing first and second preforms 50, 52 to partially melt and bond together to form midsole 10, with a portion of first and second preforms 50, 52 flowing through first channel 46 into first overflow chamber 48 to form a first overflow portion 54.

Figure 6:
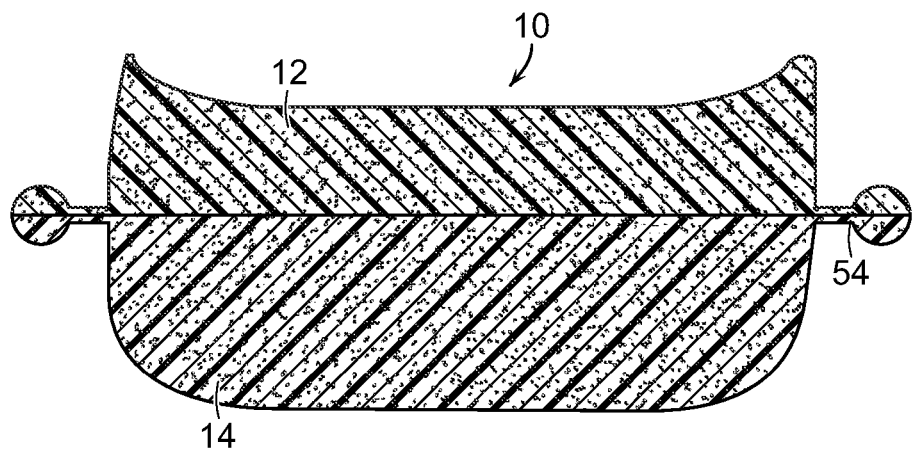
FIG. 6 is a section view of the midsole of FIG. 1 after being removed from the mold and having a first overflow portion.

After this heating step is complete, mold assembly 26 is opened, and midsole 10, formed of first portion 12 and second portion 14 with first overflow portion 54 extending outwardly from an exterior surface of midsole 10, is removed from mold assembly 26. As seen in FIG. 6, when midsole 10 is removed from mold assembly 10, it expands to some degree. In certain embodiments, midsole 10 may expand to approximately 163% of its original size.

Figure 7:
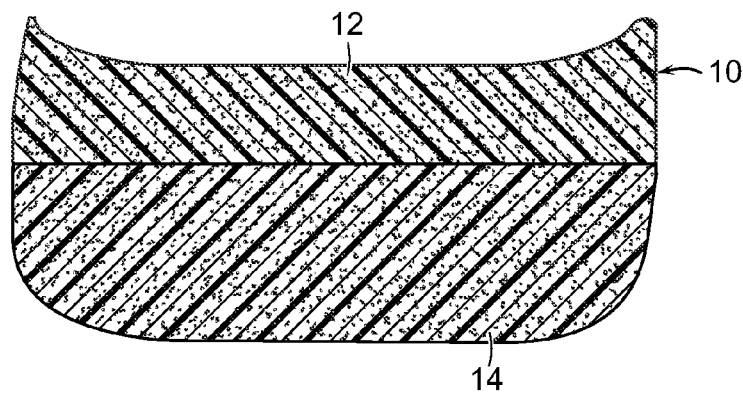
FIG. 7 is a section view of midsole of FIG. 1 after being removed from the mold and having the first overflow portion cut away.

After midsole 10 has expanded and stabilized, first overflow portion 54 is then cut away from the periphery of midsole 10, as shown in FIG. 7.

Providing first overflow chamber 48 and first channel 46 reduces the negative aesthetic effects of bleeding that can result from bonding first and second preforms 50, 52 together. As seen in FIG. 1 and FIG. 7, after cutting away first overflow portion 54, there is a more distinct line defining the boundary between first portion 12 and second portion 14.

Although, as noted above, first preform 50 and second preform 52 may both be formed of EVA, they may have different colors, as well as different physical properties such as resiliency, stiffness, and other parameters. Providing different colors and physical properties for first and second preforms 50, 52 and, therefore, first and second portions 12, 14, allows midsole 10 to be customized or optimized to provide particular aesthetic and/or performance characteristics.

For example, in certain embodiments, first portion 12 has a hardness of approximately 48 Asker C, while second portion 14 has a hardness of approximately 54 Asker C.

Figure 8:
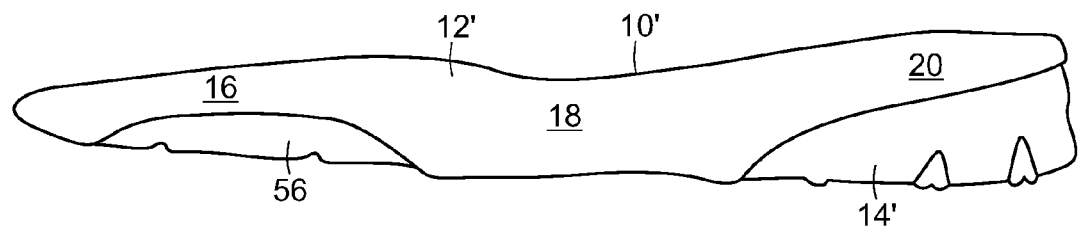
FIG. 8 is an elevation view of an alternative embodiment of a midsole formed of three different preforms.

Another embodiment of a midsole 10' is shown in FIG. 8, in which second portion 14' is positioned only in heel region 20 of midsole 10' beneath first portion 12', and a third portion 56 is positioned in forefoot region 16 of midsole 10' beneath first portion 12'. Midsole 10' is formed in substantially the same manner as midsole 10.

Figure 10:
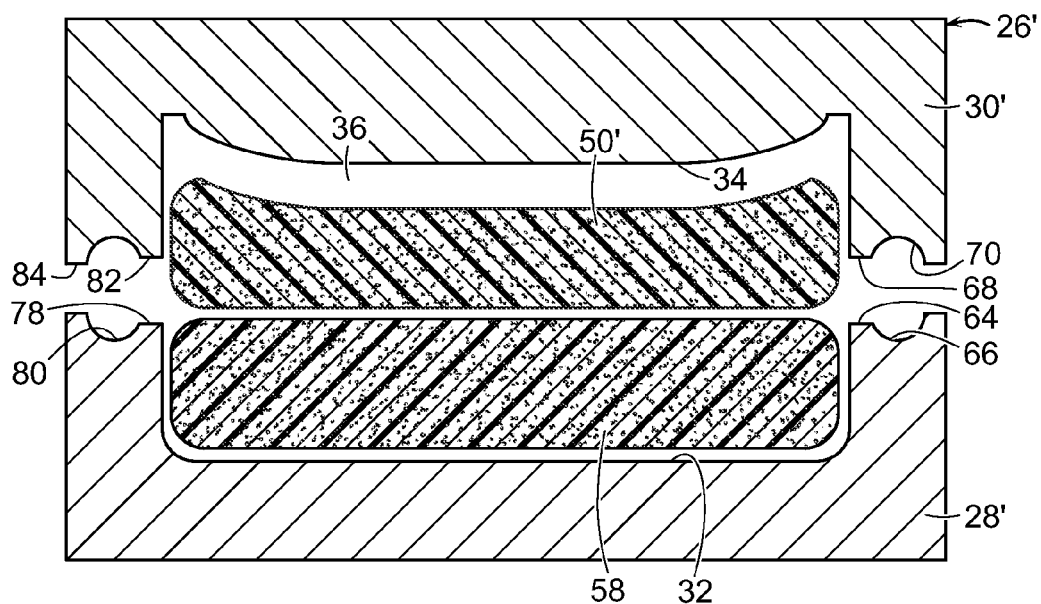
FIG. 10 is a section view of the mold used to make the midsole of FIG. 8, shown with a first preform and a third preform positioned in the mold prior to the mold being closed.

As seen in FIG. 10, which illustrates a section view of a forefoot region 16 of mold assembly 26' used to form midsole 10', a third preform 58, which forms third portion 56, is positioned beneath first preform 50' in mold assembly 26'.

Figure 9:
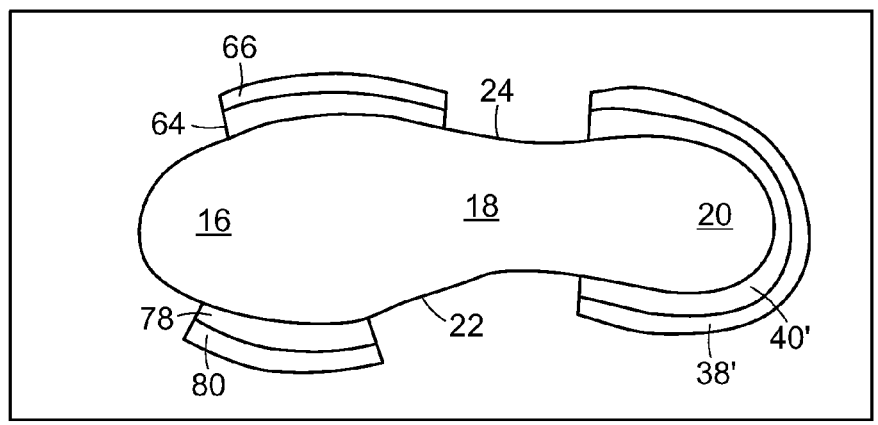
FIG. 9 is a plan view of a first portion of the mold use to make the midsole of FIG. 8.
Figure 11:
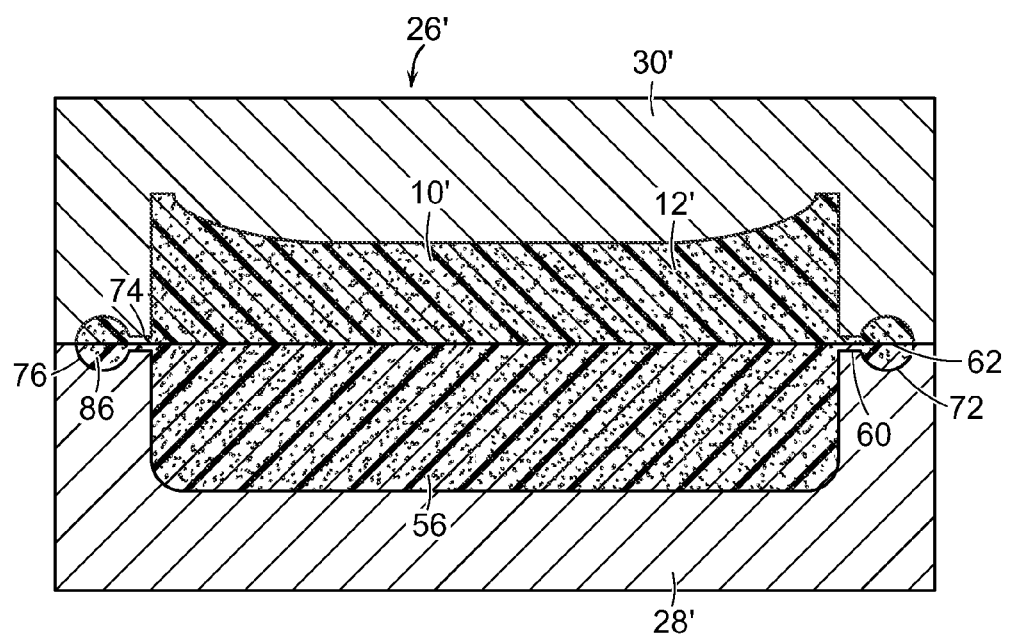
FIG. 11 is a section view of the mold of FIG. 10 shown in a closed condition with the midsole formed from the preforms and second and third overflow portions, after the heating step.

In mold assembly 26', seen in FIGS. 9-11, first channel 46 and first overflow chamber 48 extend only around heel region 20 of midsole recess 36, as best seen in FIG. 9 where first lower channel 40' and first lower overflow recess 38' are shown. Mold assembly 26' also includes a second channel 60 and a second overflow chamber 62 in a forefoot region 16 on lateral side 24, as seen in FIG. 11, which is formed by a second lower channel 64 and a second lower overflow recess 66 in first portion 28' in combination with a second upper channel 68 and a second upper overflow recess 70 in second portion 14', which are shown in FIG. 10. Second channel 60 and second overflow chamber 62 cooperate to produce a second overflow portion 72 on midsole 10', which is cut away as described above.

Further, as seen in FIG. 11, mold assembly 26' includes a third channel 74 and a third overflow chamber 76 in a forefoot region 16 on medial side 24, which is formed by a third lower channel 78 and a third lower overflow recess 80 in first portion 12' in combination with a third upper channel 82 and a third upper overflow recess 84 in second portion 14', which are shown in FIG. 10. Third channel 74 and third overflow chamber 76 cooperate to produce a third overflow portion 86 on midsole 10', which is cut away as described above.

It is to be appreciated that the channels and corresponding overflow chambers can be positioned at any point along the recess in the mold assembly. For example, a single mating channel and overflow chamber could extend around the entire periphery of the recess in the mold assembly, or extend only around forefoot region 16, only in heel region 20, or at any other single desired location. In other embodiments, any number of channel/overflow chamber combinations can be positioned at any desired locations along the recess in the mold assembly.

Thus, while there have been shown, described, and pointed out fundamental novel features of various embodiments, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method of manufacturing a footwear midsole, the method comprising:
arranging first, second, and third preforms into a first mold portion recess, a second mold portion recess cooperating with the first mold portion recess to define a midsole recess, and the first and second mold portions cooperating to define first, second, and third overflow chambers each connected to the midsole recess, wherein the second and third preforms are arranged only beneath a heel and forefoot region respectively of the first preform;
closing the mold by contacting the first and second mold portions;
heating the closed mold so as to melt the first, second, and third preforms and bond the second and third preforms to the first preform to form a midsole, each overflow chamber receiving one or more of a flowing first, second, and third preform material so as to form first, second, and third overflow portions;
removing the midsole from the mold;
allowing the removed midsole to expand; and
cutting away the first, second, and third overflow portions.

2. The method of claim 1, wherein said heating is for a predetermined period of time and at a predetermined temperature.

3. The method of claim 2, wherein the predetermined period of time is between about 5 minutes and about 8 minutes, and the predetermined temperature is about 130° C.

4. The method of claim 1, wherein the first and second preforms are formed of EVA.

5. The method of claim 1, wherein a color of the first preform is different than a color of the second preform.

6. The method of claim 1, wherein a physical property of the first preform is different than a physical property of the second preform.

7. The method of claim 1, wherein the midsole recess is substantially foot-shaped and the first overflow chamber extends around a heel portion of the midsole recess.

8. The method of claim 1, wherein the mold includes a first, second, and third overflow channel connecting the first, second, and third overflow chamber, respectively, to the midsole recess, the flowing first, second, and third preform material flowing through the first, second, and third overflow channels into each respective overflow chamber to form a respective overflow portion.

9. The method of claim 8, wherein the first mold portion includes a first second, and third lower overflow recess and a first, second, and third lower channel connecting the first second, and third lower overflow recess, respectively, to the first mold portion recess, and the second mold portion includes a first, second, and third upper overflow recess and a first, second, and third upper channel connecting the first, second, and third upper overflow recess, respectively, to the second mold portion recess, the first, second, and third lower channels combining with the first, second, and third upper channels, respectively, to define the first, second, and third overflow channels, and the first, second, and third lower overflow recesses combining with the first, second, and third upper overflow recesses, respectively, to define the first, second, and third overflow chambers.

10. The method of claim 1, wherein the second and third overflow chambers extend along opposite lateral sides of a forefoot portion of the midsole recess.

11. The method of claim 10, wherein the second and third overflow chambers only receive flowing first and third preform material during said heating so as to form the second and third overflow portions only from the first and third preform material.

12. The method of claim 11, wherein the first overflow chamber extends around a heel portion of the midsole recess and only receives flowing first and second preform material during said heating so as to form the first overflow portion only from the first and second preform material.

13. The method of claim 1, wherein the first overflow chamber extends around a heel portion of the midsole recess and only receives flowing first and second preform material during said heating so as to form the first overflow portion only from the first and second preform material.

14. The method of claim 1, wherein the footwear midsole has a one-layer midfoot region and one-layer toe region, each formed of first preform material, and a two-layer heel region and two-layer forefoot region, the heel region being formed of first and second preform material and the forefoot region being formed of first and third preform material.

* * * * *